United States Patent [19]

West

[11] 3,725,448
[45] Apr. 3, 1973

[54] PROCESS FOR THE PREPARATION OF CHROMIUM (III) NITRATE COMPLEXES WITH TRANS-ACIDS

[75] Inventor: Harry Bowman West, Wilmington, Del.

[73] Assignee: E. I. du Pont de Nemours and Company, Wilmington, Del.

[22] Filed: Dec. 22, 1971

[21] Appl. No.: 211,104

[52] U.S. Cl. .....................260/438.5 R, 260/438.5 C
[51] Int. Cl. ..............................................C07f 11/00
[58] Field of Search .................260/438.5 R, 438.5 C

[56] References Cited

UNITED STATES PATENTS

| 2,524,803 | 10/1950 | Iler | 260/438.5 C |
| 2,544,666 | 3/1951 | Goebel et al. | 260/438.5 C |
| 2,544,668 | 3/1951 | Goebel et al. | 260/438.5 C |
| 2,918,483 | 12/1959 | Varul | 260/438.5 R |
| 3,185,717 | 5/1965 | Trebilcock | 260/438.5 C |

*Primary Examiner*—Helen M. S. Sneed
*Attorney*—Paul R. Steyermark

[57] ABSTRACT

Stable, concentrated, aqueous solutions of complexes of chromium (III) nitrate with certain carboxylic trans-acids are prepared by heating the trans-acid with chromium (III) nitrate and with an alkali, the ratios of the reactants being 1 gram-atom of chromium to 1.0–1.5 gram-equivalents of alkali to 0.4–0.6 mole of the trans-acid. Solutions of these complexes are useful in the process of fabricating glass-fiber/polyolefin composites, for which the complexes are very good coupling agents.

6 Claims, No Drawings

PROCESS FOR THE PREPARATION OF CHROMIUM (III) NITRATE COMPLEXES WITH TRANS-ACIDS

BACKGROUND OF THE INVENTION

This invention relates to a process for preparing stable, concentrated, aqueous solutions for chromium (III) nitrate with certain trans-acids.

Werner-type chromium complexes with carboxylic acids are well known in the art. Thus, U.S. Pat. No. 2,524,803 (to Iler) discloses the preparation of a basic chromic chloride and of its complexes with aliphatic and aromatic monocarboxylic and polycarboxylic acids. According to the Iler disclosure, chromium trioxide is dissolved in aqueous hydrochloric acid, then is reduced with a lower aliphatic alcohol to the basic chromic chloride. The Werner complex is formed by adding to the solution a source of carboxylic acid, e.g. the acid itself or a hydrolyzable ester thereof. The complexes have utility, for example, as water repellents or coupling agents, depending on the carboxylic acid.

U.S. Pat. No. 2,544,666 (to Goebel, et al.) teaches the preparation of $\alpha,\beta$-unsaturated monocarboxylic acid complexes of chromium (III) salts in a variety of solvents, including water, alcohols, and chlorinated hydrocarbons. Basic chromium salts are used in the preparation of these complexes, salts having a basicity of not more than 50 percent being preferred. This patent covers a wide range of carboxylic acid to chromium (III) ratios, and all the examples disclose complexes of chromium (III) chloride.

The above patent does not consider the special problems that arise when one attempts to make a stable, concentrated complex of a trans-acid and chromium (III) nitrate. Trans-acids are able to coordinate with two different chromium atoms. This crosslinking, if it proceeds too far, can cause gelation or precipitation. Further, the nitrate anion tends to react with many organic solvents, especially at higher temperatures or at high concentrations. None of the processes suggested by U.S. Pat. No. 2,544,666 would be adequate to yield a concentrated, stable product.

Similar complexes are described in U.S. Pat. No. 2,544,668 (to Goebel et al.) This patent provides a process for contacting a carboxylic acid source with basic chromic salts. The latter are made, for example, by heating and partially dehydrating a chromic salt hexahydrate or by reducing a higher valence chromium compound, such as chromium trioxide or chromyl chloride. This reference cautions against allowing olation to take place, olation being defined as coordination of two chromium atoms with one hydroxyl group. Since, according to this reference, olation produces insoluble, polymeric materials, it is recommended to use the basic metal salt immediately after its preparation.

U.S. Pat. No. 2,918,483 (to Varul) teaches a process for the preparation of chromic salt complexes with carboxylic acids, wherein chromic chloride is contacted with either the carboxylic acid or an alkali metal salt of the acid, in the presence of an alkali and in an organic solvent, such as a lower aliphatic alcohol.

Another process is disclosed in U.S. Pat. No. 3,185,717 (to Trebilcock) wherein chromium trioxide, hydrochloric acid, a water-soluble alcohol, and an unsaturated monocarboxylic acid are contacted together at the same time. It is essential that the carboxylic acid be present during the reduction of the hexavalent chromium by the alcohol and hydrochloric acid.

The use of certain Werner complexes of chromic compounds as coupling agents for reinforced resin laminates is described, for example, in British Pat. No. 923,382 (to E. I. du Pont de Nemours and Company).

Most prior art methods suffer from several disadvantages. Thus, a process requiring the reduction of either chromium trioxide in the presence of hydrochloric acid or of chromyl chloride can lead only to chromic chloride compounds but is not suitable for chromium nitrate. Further, such reductions generally require an organic solvent. In several processes, insoluble, high polymers tend to form, but these are unsuitable for most applications. To overcome this problem, some methods require operation at very low concentrations, for example, 1–2 percent of the chromium salt. Finally, those processes which rely on a nonaqueous or substantially nonaqueous system are economically less attractive than those that can be carried out in water solutions. There is, therefore, a need for a convenient and inexpensive process for making water-soluble complexes of carboxylic acids with chromium (III) nitrate. In this specification and in the claims, the term "chromium (III)" will be used to designate trivalent chromium or the "chromic" oxidation state.

SUMMARY OF THE INVENTION

According to this invention, there is provided a process for preparing stable, concentrated aqueous solutions of certain trans-acid complexes of chromium (III) nitrate, wherein an aqueous dispersion of chromium (III) nitrate, an alkali, and the appropriate trans-acid is heated at from 50° C. to reflux temperature for sufficient time to substantially drive the reaction to completion, the relative ratios of the reactants being 1 gram-atom of chromium to 1.0–1.5 gram-equivalents of alkali to 0.4–0.6 mole of the trans-acid. The aqueous dispersion usually will be a solution in water; however, sometimes a precipitate forms initially when the components are combined and then dissolves as the reaction progresses.

The trans-acids suitable in the process of the present invention have the following formula (1)

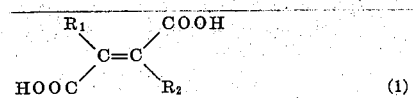

(1)

wherein each of $R_1$ and $R_2$ independently is hydrogen, alkyl, $-CH_2COOH$ or phenyl; provided that the maximum number of carbon atoms in the trans-acid is 10. It is to be noted that, for the purpose of this disclosure, a trans-acid has two carboxylic groups immediately adjacent to a double bond, these carboxylic groups being in trans-configuration to each other.

DETAILED DESCRIPTION OF THE INVENTION

Typical trans-acids suitable in the instant process include, for example, fumaric, mesaconic and trans-aconitic.

Any alkali metal or alkaline earth metal hydroxide, carbonate or bicarbonate can be used as the alkali. However, sodium hydroxide is the least expensive and the most convenient alkali. Sodium hydroxide is especially preferred when the resulting chromium (III) complex is to be used as a coupling agent because sodium hydroxide does not adversely affect its coupling activity (i.e. bond strength). The presence of calcium and lithium, on the other hand, may reduce the coupling activity of a chromium (III) complex.

The preferred starting materials are chromium (III) nitrate and fumaric acid. The resulting fumaratochromium (III) nitrate is an outstanding coupling agent for glass fiber-poly-olefin laminates.

When the trans-acid is fumaric acid, the concentrations of all the ingredients preferably are such that the resulting solution contains about 6 percent chromium by weight. It is to be noted that the usual commercial form of chromium (III) nitrate is the nonahydrate (molecular weight 400.18), and that chromium (atomic weight 52.01) constitutes but 13 weight percent of the salt. As a matter of practical consideration, it would be impossible to prepare by a direct, one-step method an aqueous solution of fumaratochromium (III) nitrate containing more than about 7 weight percent of chromium.

Solutions of trans-acid complexes of chromium (III) salts more concentrated than about 7 percent can be obtained by distilling off some of the solvent. However, for optimum storage and shipping stability, solutions containing 1-6 percent chromium by weight are preferred. More concentrated solutions can also be prepared by using a heel process wherein a portion of a previous batch of the product is used as solvent and diluent for the succeeding batch. By this procedure, concentrations up to 9% or higher can be obtained.

While in the process of this invention the order of addition of the reactants is not critical, the reaction is better controlled in a two-step process, wherein the chromium nitrate and the alkali are first contacted and the trans-acid is then added. Typically, the chromium nitrate and the alkali will be combined in water at room temperature, then heated to reflux for 10–15 minutes. The trans-acid is then added and refluxing is continued until the reaction is substantially complete. Both of these reactions may be run at lower temperatures, provided greater time is allowed for completion of the reaction.

The progress of the reaction can be conveniently followed by absorption spectroscopy. The solutions prepared in the process of this invention are blue-green and, when freshly prepared, have absorption maxima ($\lambda$) and molar extinction coefficients ($\epsilon$) in the ranges shown below:

| $\lambda(m\mu)$ | $\epsilon$(liters/mole·cm)* |
|---|---|
| $\lambda_1$ 410–415 | $\epsilon_1$ 22–28 |
| $\lambda_2$ 570–575 | $\epsilon_2$ 22–28 |

* based on gram-atoms of chromium.

The reaction is substantially complete when the molar extinction coefficients have approximately reached the above ranges. As these solutions age, the molar extinction coefficients may change.

When the ratio of alkali to chromium is within the range of 1.15 to 1.25 equivalents per gram-atom, the values of $\epsilon_1$ and $\epsilon_2$ are within the respective ranges of 25–26 and 25–27 for freshly prepared solutions. This ratio of alkali to chromium is preferred for solutions of the highest stability, especially at high chromium concentrations. Generally, outside the alkali-to-chromium range of 1.0–1.5 the solutions are unstable and either gel or form precipitates, even after short storage periods.

Instead of using a free trans-acid as one of the starting materials, it is possible to use an alkali metal or alkaline earth metal salt of the acid. In this case, the ratio of alkali to chromium includes the alkali present in the salt of the acid. If more alkali is desired, it can be added to adjust the alkali-to-chromium ratio to any higher level within the range of 1.0 to 1.5.

For solutions containing 6 percent chromium, the reflux temperature will be about 105° C., and each of the reflux periods will be about 10 minutes to one hour. Longer refluxing may degrade the product. Temperatures lower than reflux can be used, but the reaction time will generally have to be increased. Temperatures below about 50° C. are considered impractical for commercial production because of the longer reaction times. The final product may contain a small amount of an insoluble residue which can be removed by filtration.

The ratio of the trans-acid to chromium is critical. At higher ratios than 0.6 mole per gram-atom, the complex tends to gel or precipitate, especially at high chromium concentrations. Although stable solutions of complexes can be made at lower ratios than 0.4 mole per gram-atom, they usually do not have all the desirable properties of such complexes. For example, fumaratochromium(III) nitrate with a ratio of fumaric acid to chromium (III) of less than 0.4 will not be as effective a coupling agent for glass fiber-polyethylene composites as fumaratochromium (III) nitrates with a higher ratio.

The carboxylic acid complexes of this invention usually contain some olated chromium. Olation can be illustrated by the following two formulas (2) and (3), wherein each chromium atoms is placed in the center of an octahedron.

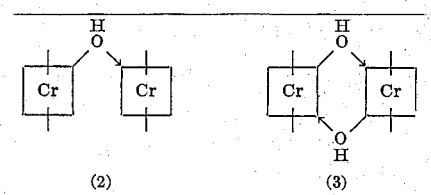

(2)         (3)

Olation was considered undesirable by Goebel et al. (U.S. Pat. No. 2,544,668), but it can be controlled by proper operating conditions so that insoluble, high molecular weight material is not formed or is formed only in negligible quantities. In the two-step process of the present invention, the chromium nitrate solution obtained in the first step, i.e., prior to the addition of the trans-acid, is olated; it contains about 1 to 1.5 "ol" bonds per atom of chromium. Depending on the relative amounts of alkali and trans-acid, some olation will usually be retained in the final product.

This invention is now illustrated by certain preferred embodiments thereof, wherein all parts, proportions, and percentages are by weight, unless indicated otherwise.

EXAMPLE 1

Chromium nitrate nonahydrate (46.2 g, 0.116 moles) was dissolved in 38 g of water. While stirring the solution, 10.9 g (0.136 equivalents) of 50 percent aqueous sodium hydroxide were added, keeping the temperature below 40° C. by the use of external cooling. Some solids were observed in the solution at this point. The temperature was then raised to reflux (106° C.) and held there for 15 minutes. The precipitate dissolved and the solution turned green. Fumaric acid (6.7 g, 0.058 moles) was added and refluxing was continued for another 15 minutes. The solution was cooled to 25° C. and filtered to remove a small amount, less than 0.1 g, of insoluble matter. The resulting solution was blue-green and was found by analysis to contain 5.9 percent chromium. The pH of this solution was 0.06.

A sample of this solution was diluted in water to 0.046 molar chromium, and the light absorption spectrum was determined on a Cary Model 11 spectrophotometer. The resulting spectrum had absorption maxima at 410 and 570 m$\mu$, with molar extinction coefficients of 25.3 and 25.7, respectively.

After two weeks of storage at 45° C., the product solution was still fluid and free of solids. The molar extinction coefficients, measured on fresh dilutions as above, had increased to 26.7 each.

After two months at room temperature, the molar extinction coefficients were remeasured on a fresh dilution of this product and were found to be 25.0 and 25.8, respectively.

The above fumaratochromium complex was then used as a coupling agent for the fabrication of two polyethylene-E-glass fiber fabric laminates. The woven E-glass fabric was a commercial grade Style 181, heat cleaned, Finish 112, available from J. P. Stevens & Co., Inc., 1460 Broadway, New York, N.Y. 10018. The polyethylene was a resin in the form of pellets commercially available as Alathon 7050 grade from E. I. du Pont de Nemours and Company.

Seventeen grams of the complex were added to 983 g of water to give a dilute coupling agent solution having a chromium concentration of 0.1 percent. The pH of this solution was adjusted upward from 2.5 to 3.0 by the addition of 4 ml of a one molar sodium bicarbonate solution.

Four 38 inches long, 6 inches wide strips of glass fabric were cut from a roll in the fill direction and soaked in the coupling agent solution for about 5 minutes. The strips were next passed through a wringer with roller tension adjusted to give a wet pickup of approximately 50 percent. The strips were then dried in a circulating-air oven for 10 min at 125° C and cut into 6 × 6 inches panels. The 24 resulting panels were frayed approximately ¼ inch on each edge, by re-moving threads parallel to the edge.

The polyethylene pellets were mixed with an equal weight of dry ice and milled through a Wiley mill, then dried in an air oven at 100° C for four hours. A fine, dry polyethylene powder was thus obtained.

Each of the two laminates was then made and tested as follows:

Thirty-nine grams of the polyethylene (PE) powder were divided into thirteen 3 g fractions. The first 3 g fraction was spread evenly at the bottom of the cavity of a 6 × 6 inches steel mold. A 6 × 6 inches treated glass fabric panel was placed flat on top of the PE powder layer, and a second 3 g fraction of PE powder was in turn spread evenly on top of the glass fabric panel. The operation was repeated until a PE-glass fabric sandwich made up of twelve layers of glass panels alternating with layers of PE powder was assembled inside the steel mold. The last 3 g fraction of PE powder was then spread evenly on the top glass fabric panel.

The steel mold thus loaded was placed in a heated press and firm pressure, enough to hold the multilayer sandwich in position, was applied. The press was then heated to 175° C, and 830 psi pressure was applied. The material was held at 830 psi and 175° C for 2 minutes. At the end of this period, the press was allowed to cool to room temperature. The pressure was then released and the mold was unloaded.

A 6 × 6 inches × ⅛ inch dense, rigid, light green, translucent laminate was obtained in this manner.

The laminate was clamped onto e reciprocating table of a precision type hydraulic feed, horizontal spindle, surface grinder and sliced into test bars, 6 × ½ × 150 inch using a 5 inches diameter resin-bonded diamond cutting wheel. The flexural strength was measured using a modified form of Federal Specification L-P-406b, Method 1031, 27 September, 1951. Five bars were tested to cut from the laminate, and four bars were tested after being submerged in boiling water for two hours. The average values obtained are referred to as "dry" and "wet" flexural strength (modulus of rupture), respectively. The two laminates had dry strengths of 47,100 and 47,200 psi, respectively, and the wet strengths of 43,400 and 44,200 psi, respectively. This compares to dry and wet strengths of 15,000 and 8,000 psi, respectively, for a laminate made without the use of a coupling agent.

EXAMPLE 2

Chromium nitrate nonahydrate (46.2 g, 0.116 moles) was dissolved in 33,2 g of water. Fumaric acid (6.7 g, 0.058 moles) was added and the mixture was heated while stirring. When the temperature reached 100° C, 13.9 g (0.173 equivalents) of 50 percent aqueous sodium hydroxide was added. Some precipitate was observed to have formed. The mixture was heated to reflux (106° C.) and held there for 30 minutes. The resulting solution, cooled to room temperature, had a pH of 0.37 and was found by analysis to contain 6.3 percent chromium. Its light absorption spectrum had the following absorption maxima and molar extinction coefficients:

| $\lambda(m\mu)$ | $\epsilon$(liters/mole cm) |
|---|---|
| 415 | 27.1 |
| 575 | 26.9 |

After two months of storage at room temperature, some precipitate was observed to have formed in the solution.

EXAMPLE 3

Chromium nitrate nonahydrate (46.2 g, 0.116 moles) was dissolved in 38 g of water. The solution was stirred and heated to 90° C. where 9.3 g (0.116 equivalent) of 50 percent aqueous sodium hydroxide were added. The mixture was heated to reflux (106° C.) for 5 minutes, then 6.7 g (0.058 moles) of fumaric acid was added and the mixture refluxed for 15 minutes. The solution was cooled to 25° C. After two hours at 25° C., some solids were observed to have formed. After filtration to remove these solids (0.5 g), the light absorption spectra were determined, with the following results.

| $\lambda(m\mu)$ | $\epsilon$(liters/mole cm) |
|---|---|
| 410 | 22.7 |
| 575 | 22.9 |

EXAMPLE 4

Example 1 is repeated, except that the two refluxing steps are replaced by two heating periods, each being carried out at 70° C. for one hour. The resulting solution is used as a coupling agent in glass fabric-polyethylene panels as in Example 1. The resulting laminates are stronger than the untreated controls.

EXAMPLE 5

Chromium nitrate nonahydrate (46.2 g, 0.116 moles) is dissolved in 50 g of water. The solution is stirred and heated to 90° C., where 12.4 g (0.064 moles) of dipotassium fumarate is added. The mixture is then heated to reflux for 15 minutes. After cooling to room temperature, a small amount of insoluble residue is removed by filtration. The resulting solution is stable for at least one week at 25° C.

I claim:

1. A process for the preparation of a stable, aqueous solution of a chromium (III) nitrate complex with a trans-acid having the formula

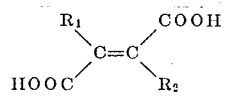

wherein
each of $R_1$ and $R_2$ independently is hydrogen, alkyl, phenyl, or the —$CH_2COOH$ group; provided that the maximum number of carbon atoms in the trans-acid is 10;

said process comprising heating at 50° C. to reflux an aqueous dispersion of chromium (III) nitrate, the trans-acid, and an alkali, for a sufficient time to substantially drive the reaction to completion; the reaction time being about 10 minutes to one hour;

the proportions of the starting materials being 1-1.5 gram-equivalents of the alkali and 0.4-0.6 mole of the trans-acid per mole of chromium (III) nitrate.

2. The process of claim 1 wherein the trans-acid is selected from fumaric acid, mesaconic acid, and trans-aconitic acid.

3. The process of claim 1 which is carried out in two sequential steps, as follows:
   1. chromium (III) nitrate and the alkali are heated at 50° C. to reflux for a period of about 10 minutes to 1 hour; and
   2. The trans-acid is added and heating is continued for a period of about 10 minutes to 1 hour.

4. The process of claim 1 wherein the concentration of chromium in the resulting solution is 1-7 weight percent.

5. The process of claim 1 wherein the alkali is an alkali metal or alkaline earth metal hydroxide, carbonate, or bicarbonate.

6. The process of claim 5 wherein the alkali is sodium hydroxide, carbonate, or bicarbonate, and the trans-acid is fumaric acid.

* * * * *